United States Patent
Chung

(10) Patent No.: US 8,065,505 B2
(45) Date of Patent: Nov. 22, 2011

(54) STALL-FREE PIPELINED CACHE FOR STATICALLY SCHEDULED AND DISPATCHED EXECUTION

(75) Inventor: Chris Yoochang Chung, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 577 days.

(21) Appl. No.: 11/839,856

(22) Filed: Aug. 16, 2007

(65) Prior Publication Data

US 2009/0049287 A1    Feb. 19, 2009

(51) Int. Cl.
*G06F 9/30* (2006.01)
*G06F 9/38* (2006.01)

(52) U.S. Cl. ...................................... 712/219

(58) Field of Classification Search .................... 712/219
See application file for complete search history.

(56) References Cited

U.S. PATENT DOCUMENTS

| | | | | |
|---|---|---|---|---|
| 4,717,951 A * | 1/1988 | Fling | 348/566 |
| 5,559,977 A * | 9/1996 | Avnon et al. | 712/244 |
| 5,943,687 A * | 8/1999 | Liedberg | 711/156 |
| 6,098,166 A * | 8/2000 | Leibholz et al. | 712/216 |
| 6,163,837 A * | 12/2000 | Chan et al. | 712/216 |
| 7,447,879 B2 * | 11/2008 | Luick | 712/219 |
| 7,490,230 B2 * | 2/2009 | Jensen et al. | 712/245 |
| 7,519,796 B1 * | 4/2009 | Golla et al. | 712/225 |
| 2003/0163675 A1 * | 8/2003 | Bennett et al. | 712/228 |
| 2003/0225996 A1 * | 12/2003 | Thompson | 712/207 |
| 2004/0123081 A1 * | 6/2004 | Knies et al. | 712/225 |
| 2006/0179274 A1 * | 8/2006 | Jones et al. | 712/205 |
| 2006/0206692 A1 * | 9/2006 | Jensen | 712/215 |
| 2006/0224864 A1 * | 10/2006 | DeMent et al. | 712/219 |
| 2007/0186073 A1 * | 8/2007 | Luick | 711/169 |
| 2007/0260856 A1 * | 11/2007 | Tran et al. | 712/217 |
| 2007/0283098 A1 * | 12/2007 | O'Brien et al. | 711/118 |
| 2008/0168260 A1 * | 7/2008 | Zyuban et al. | 712/214 |
| 2009/0077354 A1 * | 3/2009 | Rangan et al. | 712/224 |

* cited by examiner

*Primary Examiner* — Aimee Li
(74) *Attorney, Agent, or Firm* — Robert D. Marshall, Jr.; W. James Brady; Frederick J. Telecky, Jr.

(57) ABSTRACT

This invention provides flexible load latency to pipeline cache misses. A memory controller selects the output of one of a set of cascades inserted execute stages. This selection may be controlled by a latency field in a load instruction or by a latency specification of a prior instruction. This invention is useful in the great majority of cases where the code can tolerate incremental increases in load latency for a reduction in cache miss penalty.

6 Claims, 6 Drawing Sheets

STALL-FREE PIPELINED CACHE FOR STATICALLY SCHEDULED AND DISPATCHED EXECUTION

TECHNICAL FIELD OF THE INVENTION

The technical field of this invention is cache memory in data processing devices.

BACKGROUND OF THE INVENTION

Cache has been widely used in digital signal processors (DSPs) as well as general purpose processors in achieving high operating clock frequency. Cache accesses are typically pipelined, thus load instructions can be issued every cycle. Due to the pipelined nature of the processing, there is a certain amount of latency for load instructions. Table 1 illustrates the pipeline stages and their functions for a typical digital signal processor.

TABLE 1

| Nemonic | Name | Action |
| --- | --- | --- |
| PG | Program Address Generate | Determine Address of Fetch Packet |
| PS | Program Address Send | Send Address of Fetch Packet to memory |
| PW | Program Wait | Perform Program memory access |
| PR | Program Data Receive | Fetch Packet reaches CPU boundary |
| DP | Dispatch | Determine next execute packet in fetch packet and send to functional unit for decode |
| DC | Decode | Decode Instructions in functional units |
| E1 | Execute1 | All instructions: evaluate conditions and read operands<br>Load and Store instructions: perform address generation and write address modifications to register file<br>Branch instructions: branch fetch packet in PG phase<br>Single cycle instructions: write results to register file |
| E2 | Execute2 | Load instructions: send address to memory<br>Store instructions: send address and data to memory<br>Saturating single cycle instructions: update SAT bit in control status register<br>Multiply instructions: write results to register file |
| E3 | Execute3 | Load and store instructions: perform memory accesses<br>Saturating multiply instructions: update SAT bit in control status register |
| E4 | Execute4 | Load instructions: bring data to CPU |
| E5 | Execute5 | Load instructions: write data to register file |

Program fetch is performed in four pipeline stages PG, PS, PW and PR. Program decode is made up of the DP and DC pipeline stages. Execution takes place in pipeline stages E1 to E5. Note that differing instructions include differing number of execute pipeline stages. Single cycle instructions including add, subtract and logical operations complete in a single execute stage (E1) except for updating the SAT bit in the control status register. Multiply instructions complete in execute stage E2 except for updating the SAT bit in the control status register. Store instructions complete in execute stage E3. Load instructions complete in execute stage E5.

FIG. 1 illustrates the functions of an example VLIW DSP including the pipeline phases of the processor. Fetch phase 100 includes the PG pipeline stage 101, the PS pipeline stage 102, the PW pipeline stage 103 and the PR pipeline stage 104. In each of these pipeline stages the DSP can perform eight simultaneous commands. These commands are summarized in Table 2. The decode phase 110 includes the DP pipeline stage 105 and the DC pipeline stage 106. Decode phase 110 also performs commands from Table 2.

TABLE 2

| Instruction Mnemonic | Instruction Type | Functional Unit Mapping |
| --- | --- | --- |
| ST | Store | D-Unit |
| SADD | Signed Add | L-Unit |
| SMPYH | Signed Multiply | M-Unit |
| SMPY | Signed Multiply | M-Unit |
| SUB | Subtract | L-Unit S-Unit; D-Unit |
| B | Branch | S-Unit |
| LD | Load | D-Unit |
| SHR | Shift Right | S-Unit |
| MV | Move | L-Unit |

FIG. 1 illustrates memory hardware external to the CPU. Program cache memory 111 stores the instructions to be performed and data cache memory 126 stores all operands in immediate use. Memory controller 125 performs program fetch control and memory controller 112 performs data transfer control. Bulk data storage resides in external memory 131. Level-2 cache 127 provides high-speed access to data in current use.

Execute phase 120 performs all other operations including: evaluation of conditions and status; Load-Store instructions; Branch instructions; and single cycle instructions. Execute stages E1 107, E2 108 prepare for the E3 109 stage cache memory access from data cache memory 126 to retrieve the required operand.

Upon a cache hit, processing proceeds to execute stage E4 117 and then to execute stage E5 124 with results stored in the register file. Upon a cache miss, memory controller 112 inserts a fixed number of stall cycles via path 128 allowing data to be retrieved from level-2 cache 127 or external memory 131. Data is returned to the pipeline via path 130.

FIG. 2 illustrates the manner in which the pipeline is filled in an example pipeline execution of a DSP that has a four cycle load latency. Successive fetch stages can occur every clock cycle. In a given fetch packet, such as fetch packet n 200, the fetch phase is completed in four clock cycles with the pipeline stages PG 201, PS 202, PW 203 and PR 204 as described in Table 1. In fetch packet n the next two clock cycles fifth 205 and sixth 206 are devoted to the program decode stage phase including dispatch stage 205 and decode stage 206. The seventh clock cycle 207 and succeeding clock cycles of fetch packet n are devoted to the execution of the commands of the instructions of the packet. Any additional processing that may be required in processing a given packet, if not executed in the first eleven clock cycles could result in pipeline stalls or data memory stalls.

Referring back to FIG. 1, cache memory accesses are initiated during pipeline stages E2 108 and E3 109 and the data is brought to the CPU boundary at pipeline stage E4 via path 130. At pipeline stage E5 124, data is written into the register file. For a cache miss 128, the pipeline stalls CPU at pipeline stage E3. FIG. 3 illustrates such a stall is at 301. This example includes two assumptions: a four cycle cache miss penalty; and the second load accesses the same cache line as the first load.

The overhead of stall cycles due to cache misses depends on the cache miss penalty and a cache hit ratio of the code executed. It is highly desirable to reduce or eliminate these stall cycles to better utilize the processing core.

SUMMARY OF THE INVENTION

Current digital signal processors utilize cache memory for storage of program and operand data. Cache storage incurs stall cycles upon cache misses in these statically scheduled processors with dispatched execution. The present invention provides flexible load latency so that cache misses can be effectively pipelined. This approach is advantageous if the code can tolerate increased load latency, which normally presents no performance penalty.

BRIEF DESCRIPTION OF THE DRAWINGS

These and other aspects of this invention are illustrated in the drawings, in which.

DETAILED DESCRIPTION OF PREFERRED EMBODIMENTS

Cache misses initiate CPU stalls at pipeline stage E3 because the code is normally written with an assumption that data loaded from cache are always available in four cycles. If the code can tolerate more than four cycle latency, the number of stall cycles can be reduced or completely removed.

Figure 4:
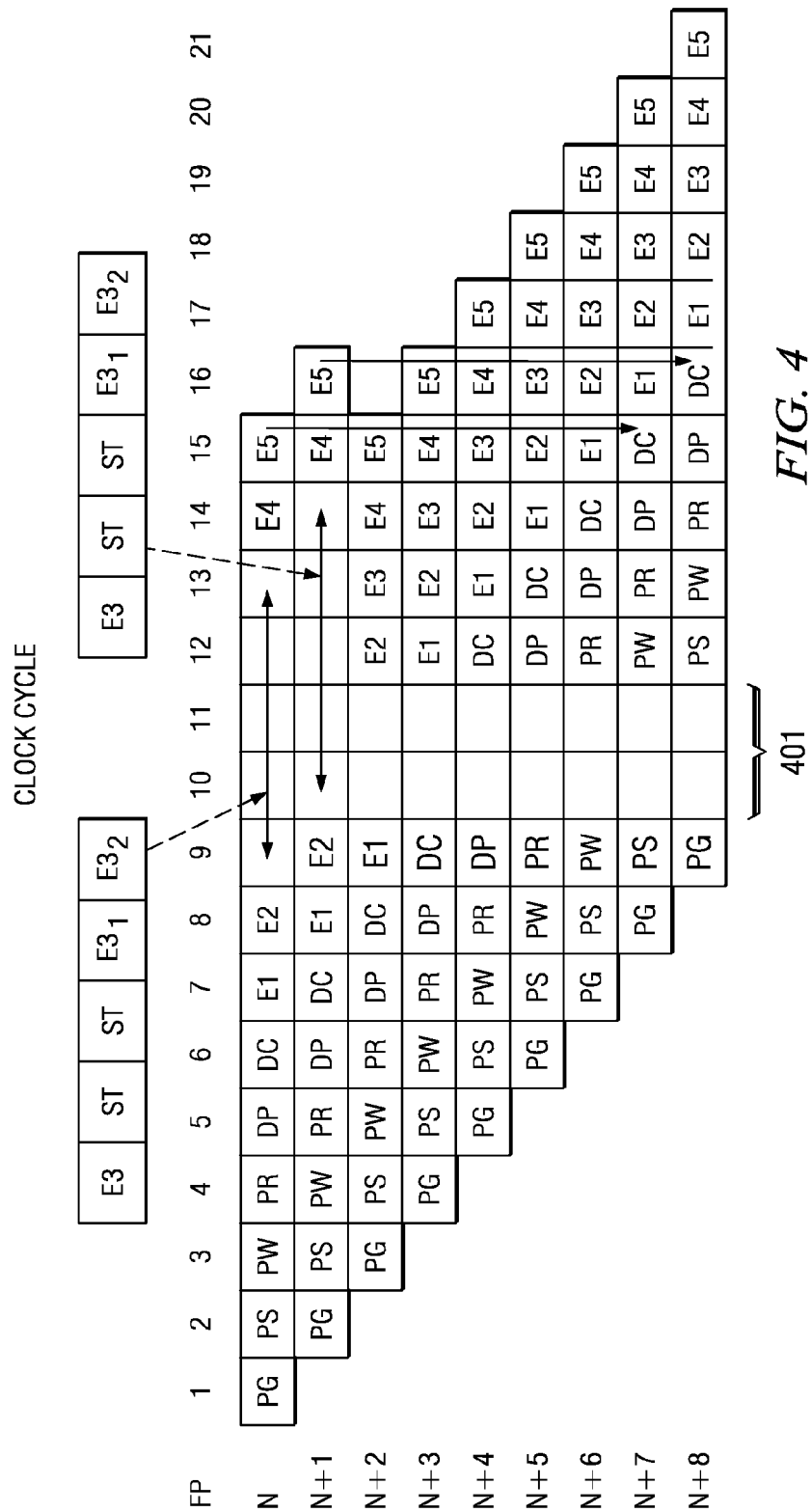
FIG. 4 illustrates an example of this invention of a pipelined cache miss assuming a six cycle load latency in which the cache inserts only two stall cycles at pipeline stage E3.

FIG. 4 illustrates an example of this invention where the code assumes four cycle load latency. Upon a cache miss, the cache inserts only two stall cycles 401 at E3. The example of FIG. 4 assumes that cache misses can be pipelined. In addition as part of the invention, a miss-under-service bit must be added to each cache line, so that a following access to the cache line being fetched can be a hit. The memory data controller 112 is modified to cause pipeline data to accumulate in additional pipeline stages inserted between E3 109 and E4 117. This data is re-inserted into the pipeline starting at the fifteenth clock cycle as shown in FIG. 4.

Table 3 shows the pipeline data re-inserted into the pipeline at the 15th clock cycle.

TABLE 3

| Pipeline Data | E3 | ST | ST | E3$_1$ | E3$_2$ |
|---|---|---|---|---|---|
| Reinserted as | | | E3 | E4 | E5 |

Figure 5:
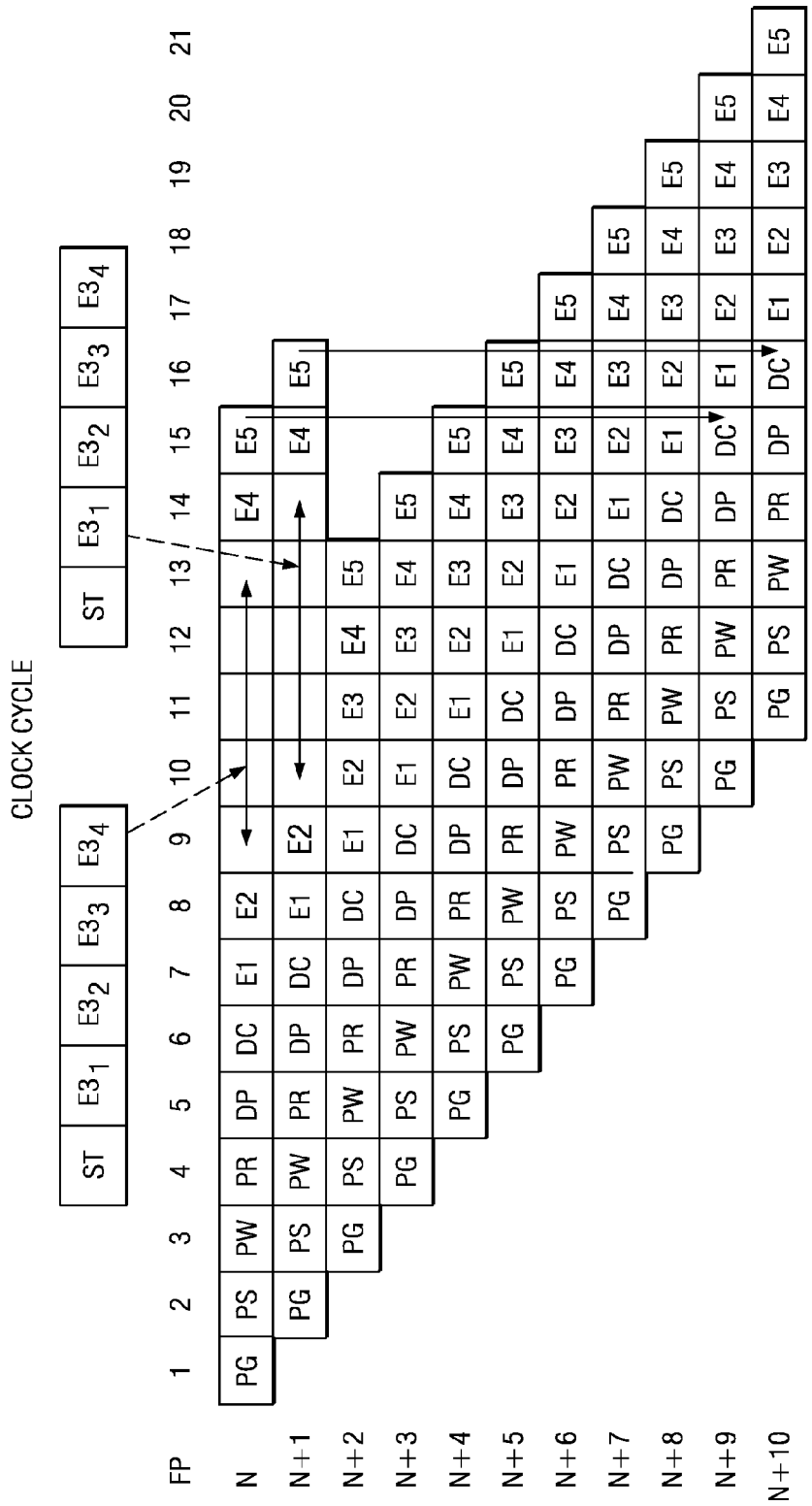
FIG. 5 illustrates another example of this invention of an access following a cache miss assuming an eight cycle load latency needing no stall insertions.

FIG. 5 illustrates another example of this invention where the code assumes an eight cycle load latency. In this case no stall needs to be inserted even though a following access is another miss. The example of FIG. 5 assumes that cache misses can be pipelined. Also as in the previous example, a miss-under-service bit must be added to each cache line, so that a following access to the cache line being fetched can be a hit. The memory data controller 112 is modified to cause pipeline data to be accumulated in additional pipeline stages inserted between E3 and E4. This data is re-inserted into the pipeline starting at the fifteenth clock cycle as shown in FIG. 5.

Table 4 shows the pipeline data re-inserted into the pipeline at the 15th clock cycle.

TABLE 4

| Pipeline Data | E3 | E3$_1$ | E3$_2$ | E3$_3$ | E3$_4$ |
|---|---|---|---|---|---|
| Reinserted as | | | E3 | E4 | E5 |

Figure 1:
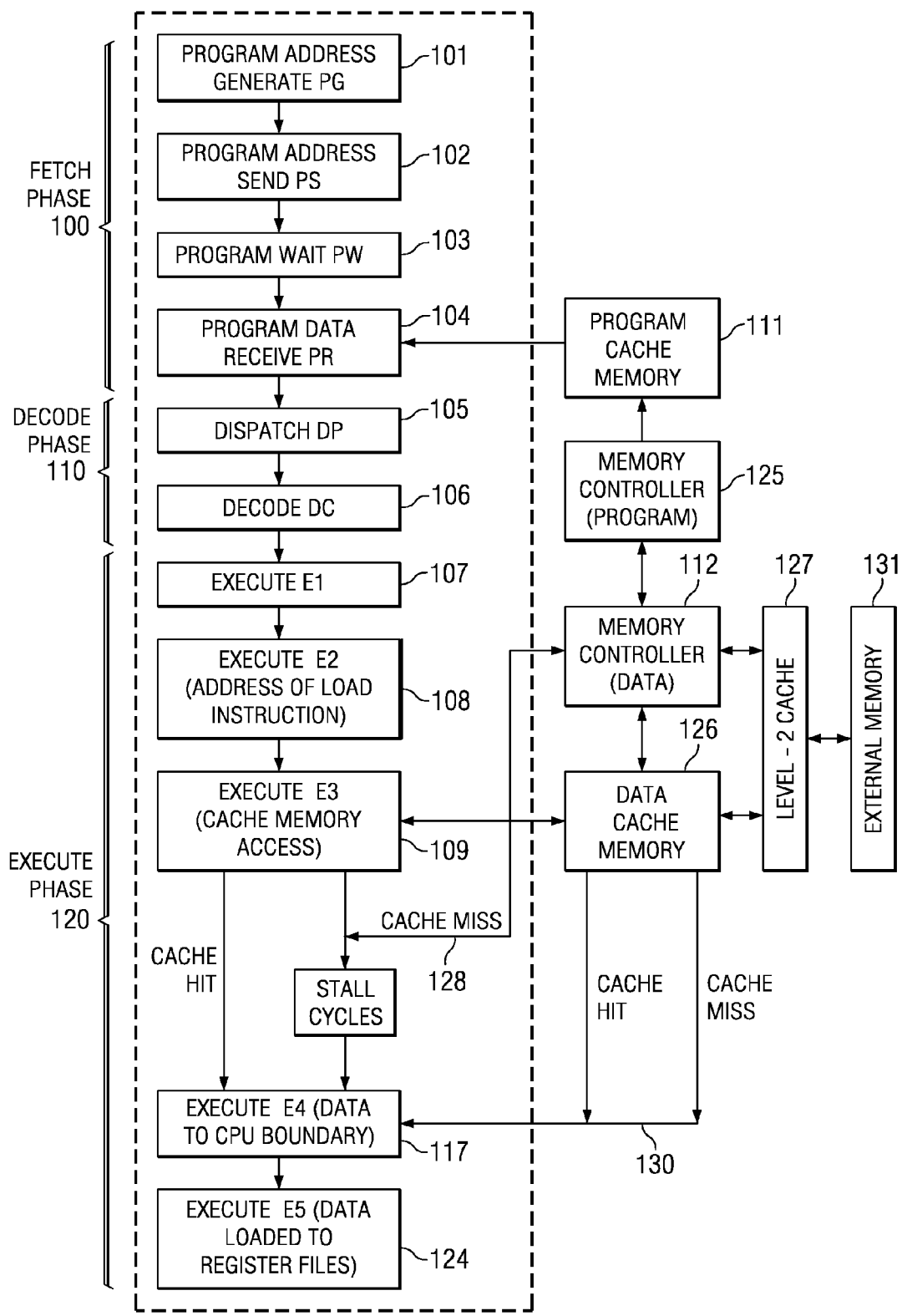
FIG. 1 illustrates the block diagram of the functions and pipeline stages of a VLIW DSP (Prior Art)
Figure 2:
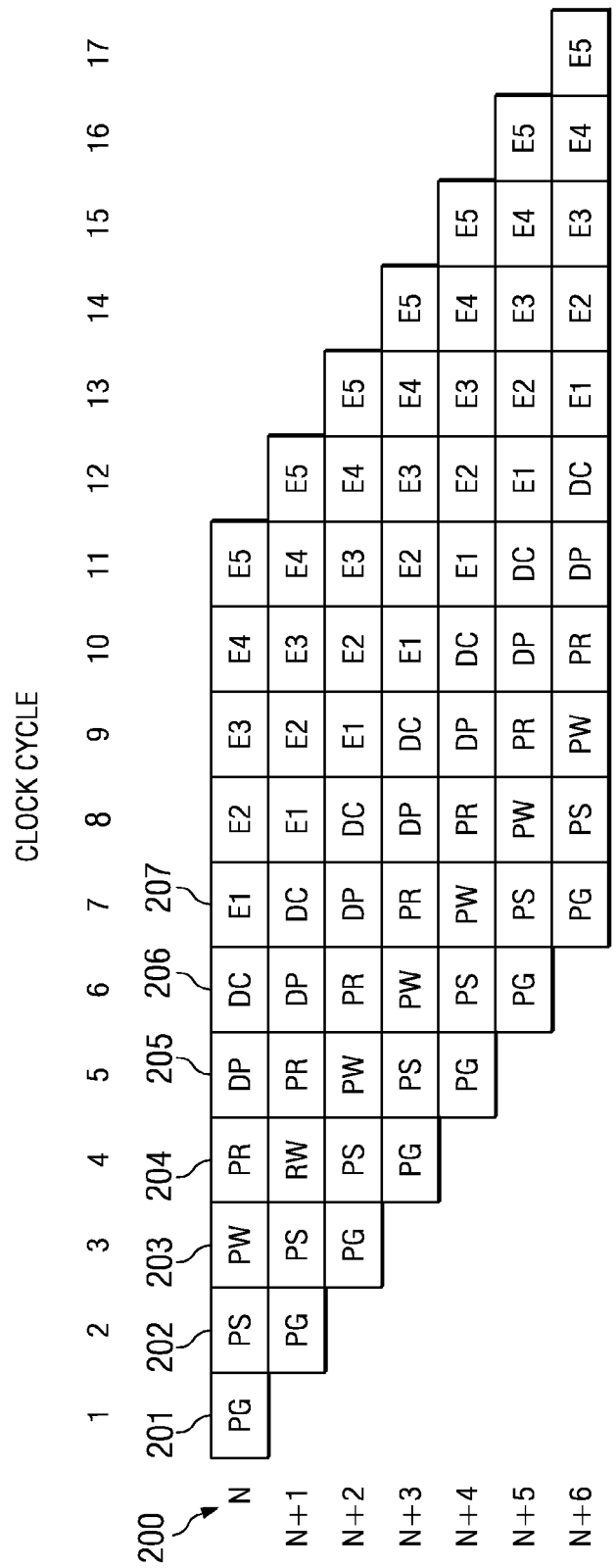
FIG. 2 illustrates an example pipeline execution of a DSP having a four cycle load latency and how the pipeline is filled (Prior Art)
Figure 3:
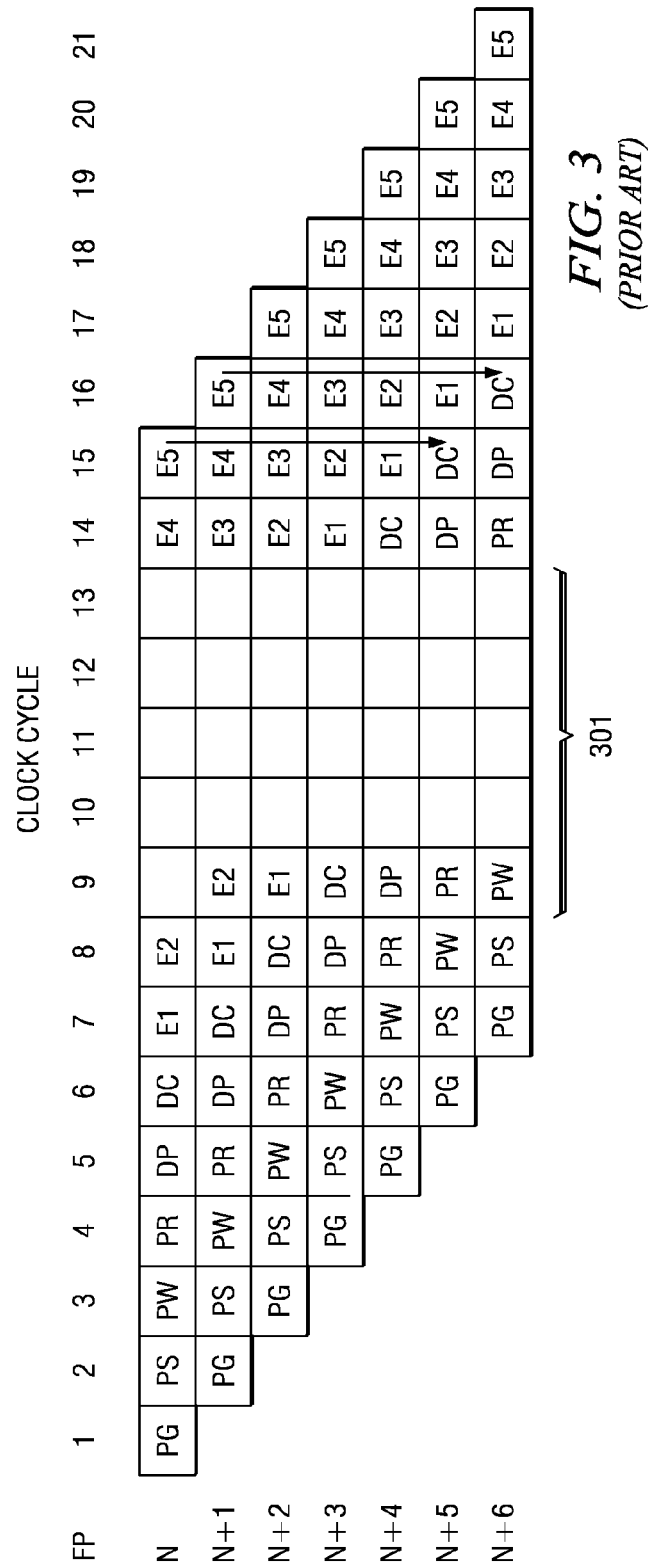
FIG. 3 illustrates an example of a pipelined cache miss assuming a four cycle load latency in which the cache inserts four stall cycles at pipeline stage E3 (Prior Art)
Figure 6:
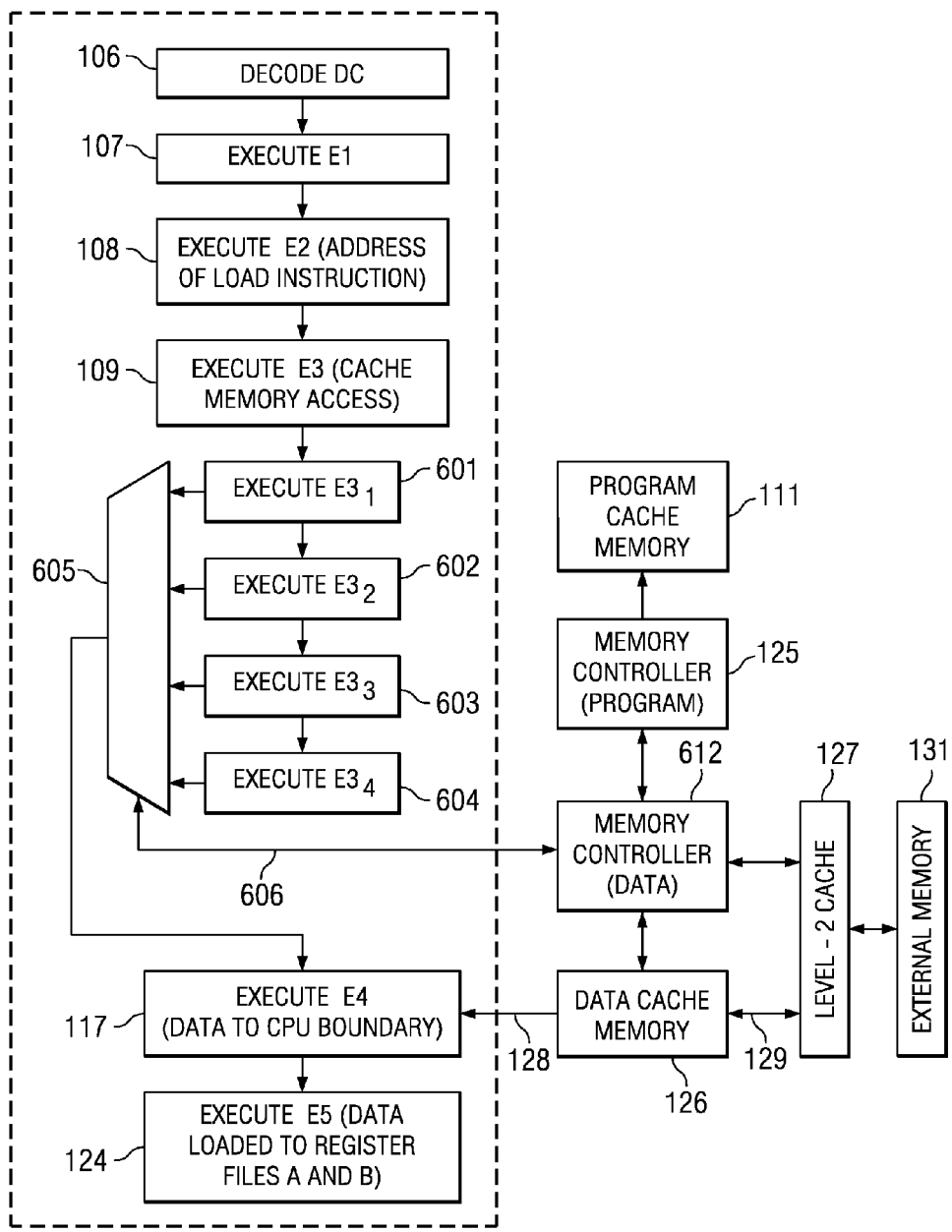
FIG. 6 illustrates the functions of a VLIW DSP with a four cycle cache miss penalty and an eight cycle load latency.

FIG. 6 illustrates the pipeline structure of the processor of FIG. 1 modified to accentuate the bypass feature available for pipeline data in the case of the examples of FIGS. 4 and 5. Four additional pipeline stages 601 through 604 are inserted into the pipeline between pipeline stages E3 109 and E4 117. Data memory controller 612 is configured to determine the number of stages to be inserted and these are coded in signal 606 to select the routing for multiplexer 605.

The negative effects of longer load latency are: longer code schedule length; and bigger code size. The longer schedule length can be negligible if the number of loop iterations is large enough.

The load latency can be dynamically changed in the code via several means. For example, load instructions can explicitly specify the expected latency. Another possible approach is a set up instruction specifying latency for following load instructions. In this case, the latency information must go through the load pipeline and be stored in the cache controller. A further alternative embodiment includes a no-allocate load that does not stall the cache. Note that this concept can be applied to the instruction cache.

The cache miss penalty for a read miss can be worsened due to other architectural limitations. For example, a write buffer in many DSPs is always flushed for a read miss. To make this invention more effective, this kind of conflict must be handled more actively. The write buffer is not flushed unless it contains data for a read miss. Other unnecessary stalls worsening the read miss penalty must be handled similarly.

Consider a simple but extreme case where 512 units of 32-bit data are loaded and accumulated. Assume the cache miss penalty is eight cycles, the amount of data words to load is 2048 bytes or 512 data words, the cache line size is 32 bytes or eight data words and the load latency is four cycles. From the cache line size and amount of data to load, the number of cache misses is 64. Thus the number of stall cycles is 512. The total number of execution cycles without cache miss penalty is 517. This is the sum of 6 and 511 since the schedule length is 6 cycles and there are 512 pipelined iterations. In this example, the total number of cycles including cache miss stalls is 1029 (the sum of 512 and 517) when fully software pipelined. This results in about 50% of cache miss overhead.

A load latency of 12 cycles completely hides the miss penalty but increases the schedule length from 6 to 14. In this case the total number of cycles becomes 525 (the sum of 14 and 511), resulting in about two times speedup.

What is claimed is:

1. A method of operating a pipelined processor with cache memory including the steps of:
    statically scheduling data access when said data access is expected to be a cache miss;
    statically scheduling data processing operations following the statically scheduled data access;
    executing other pipeline stage data during any cache miss that may occur;
    inserting pipeline stages at run time corresponding to an expected cache miss penalty;
    forwarding data upon service of cache miss; and
    load instructions specifying the expected cache miss penalty and the number of inserted pipeline stages corresponding to the expected cache miss penalty.

2. A method of operating a pipelined processor with cache memory including the steps of:
    statically scheduling data access when said data is expected to be a cache miss;
    statically scheduling data processing operations following the statically scheduled data access;
    executing other pipeline stage data during any cache miss that may occur;
    inserting pipeline stages at run time corresponding to an expected cache miss penalty;
    forwarding data upon service of cache miss; and
    an instruction executed before a load instruction specifying the expected cache miss penalty and the number of inserted pipeline stages for following load instructions corresponding to the expected cache miss penalty.

3. A pipelined data processor comprising:
    decode stage logic;
    at least one initial normal execute stage logic having an input connected to said decode stage logic and an output;
    at least one final normal execute stage logic having an input;
    a plurality of inserted execute stage logics disposed in a sequence, each inserted execute stage logic having an input and an output, said input of each execute stage logic connected to said output of a prior execute stage logic in said sequence, said output of each execute stage logic connected to said input of a subsequent execute stage logic in said sequence, said input of a first execute stage logic in said sequence connected to said output of said at least one input normal execute stage logic; and
    a multiplexer receiving outputs from each of said plurality of inserted execute stage logics and supplying an output from a selected one output of said plurality of inserted execute stage logics to said input of said final normal execute stage logic.

4. The pipeline data processor of claim 3 further comprising:
    a memory controller coupled to said multiplexer and controlling said selected inserted execute stage logic.

5. A pipeline data processor comprising:
    decode stage logic;
    at least one initial normal execute stage logic having an input connected to said decode stage logic and an output;
    at least one final normal execute stage logic having an input;
    a plurality of inserted execute stage logics disposed in a sequence, each inserted execute stage logic having an input and an output, said input of each execute stage logic connected to said output of a prior execute stage logic in said sequence, said output of each execute stage logic connected to said input of a subsequent execute stage logic in said sequence, said input of a first execute stage logic in said sequence connected to said output of said at least one input normal execute stage logic;
    a multiplexer receiving outputs from each of said plurality of inserted execute stage logics and supplying an output from a selected one output of said plurality of inserted execute stage logics to said input of said final normal execute stage logic; and
    a memory controller coupled to said multiplexer and controlling said selected inserted execute stage logic, said memory controller responsive to load instructions specifying a number of stages insertion for selecting a corresponding one output of said plurality of inserted execute stage logic for each load instruction.

6. A pipeline data processor comprising:
    decode stage logic;
    at least one initial normal execute stage logic having an input connected to said decode stage logic and an output;
    at least one final normal execute stage logic having an input;
    a plurality of inserted execute stage logics disposed in a sequence, each inserted execute stage logic having an input and an output, said input of each execute stage logic connected to said output of a prior execute stage logic in said sequence, said output of each execute stage logic connected to said input of a subsequent execute stage logic in said sequence, said input of a first execute stage logic in said sequence connected to said output of said at least one input normal execute stage logic;
    a multiplexer receiving outputs from each of said plurality of inserted execute stage logics and supplying an output from a selected one output of said plurality of inserted execute stage logics to said input of said final normal execute stage logic; and
    a memory controller coupled to said multiplexer and controlling said selected inserted execute stage logic, said memory controller responsive to a latency setting instruction specifying a number of stages insertion for selecting a corresponding one output of said plurality of inserted execute stage logic for each load instruction.

* * * * *